United States Patent [19]

Wellington

[11] Patent Number: 5,311,943
[45] Date of Patent: May 17, 1994

[54] BLENDS OF PROPOXY AND ETHOXY SURFACTANTS

[75] Inventor: Scott L. Wellington, Houston, Tex.

[73] Assignee: Shell Oil Company, Houston, Tex.

[21] Appl. No.: 963,223

[22] Filed: Oct. 19, 1992

[51] Int. Cl.$^5$ .............................................. E21B 43/22
[52] U.S. Cl. .................................... 166/274; 166/275; 252/8.554
[58] Field of Search ........................ 166/273, 274, 275; 252/8.554

[56] References Cited

U.S. PATENT DOCUMENTS

| | | |
|---|---|---|
| 3,770,632 | 11/1973 | Gilliam et al. |
| 3,946,182 | 3/1976 | Gale et al. |
| 3,977,471 | 8/1976 | Gale et al. |
| 4,194,565 | 3/1980 | Kalfoglou |
| 4,293,428 | 10/1981 | Gale et al. |
| 4,446,079 | 5/1984 | Hoskin . |
| 4,460,481 | 7/1984 | Schievelbein .................... 166/275 X |
| 4,485,873 | 12/1984 | Balzer et al. .................. 252/8.554 X |
| 4,552,673 | 11/1985 | Grolitzer ......................... 252/8.554 |
| 4,722,396 | 2/1988 | Balzer .......................... 252/8.554 X |
| 4,821,803 | 4/1989 | Debons ......................... 252/8.554 X |
| 4,979,564 | 12/1990 | Kalpakci et al. ............... 166/275 X |
| 5,013,462 | 5/1991 | Danley ............................. 252/8.554 |

Primary Examiner—George A. Suchfield
Attorney, Agent, or Firm—Del S. Christensen

[57] ABSTRACT

A mixture of propoxylated and ethoxylated surfactants is provided, along with a method to displace water flood residual oil from subterranean formations utilizing this mixture. The mixture is considerably less expensive than surfactants containing both propoxy and ethoxy groups, but provides the advantages of a graded lipophilic to hydrophilic structure of such surfactants.

11 Claims, No Drawings

BLENDS OF PROPOXY AND ETHOXY SURFACTANTS

FIELD OF THE INVENTION

This invention relates to a process to recover oil from subterranean formations and a surfactant mixture useful therefor.

BACKGROUND OF THE INVENTION

Recovery of oil from subterranean formations utilizing the natural forces present within the reservoir, or primary recovery, result in a significant portion of the oil remaining in the formation. A variety of supplemental techniques have been employed to recover the oil which remains within the formation after the primary recovery. The most widely utilized supplemental technique is water flooding. Water flooding is accomplished by injection of water, or brine, into the reservoir via injection wells to displace residual oils toward recovery wells. Water alone is not particularly effective at displacing oil because of the high interfacial tension between the oil and the water. The water therefore traps a significant portion of the residual oil in the formation by capillary forces.

Surfactants can be added to water flood injection waters to lower the interfacial tension between the oil and the water, significantly improving oil recovery. Unfortunately, the surfactants are generally not effective in the presence of divalent cations such as magnesium and calcium. Divalent cations typically cause these surfactants to precipitate. Further, the formation rock will tend to absorb surfactant, resulting in a large amount of surfactants being required in order to maintain an effective level of surfactants at the oil-water interface.

Surfactants which are effective in spite of the presence of multivalent cations have been developed, and are taught in U.S. Pat. Nos. 4,446,079 and 4,293,428. These patents disclose propoxylated ethoxylated surfactants which can be designed to result in a low interfacial surface tension in the presence of water phase salinity. The design of the surfactant is altered by adjusting the carbon number of the alkyl group, the number of propylene oxide units included, and the number of ethylene oxide units included. Alteration of those parameters varies the hydrophobe/hydrophile ratio to match the ratio which minimizes interfacial tension between water of the salinity required and the reservoir oil. The examples of U.S. Pat. No. 4,446,079 indicate that surface tensions in the mdynes/cm range can be achieved in 8 percent salinity brine with only 0.01 percent by weight of surfactant. However, the propoxylated-ethoxylated surfactants are relatively expensive. Further, tailoring such a surfactant for specific applications assures that volume production of the surfactants, and the resulting economies of scale will never be achieved. It would be desirable to achieve high levels of oil recovery with less expensive surfactant that do not need to be tailored to best recover oil from specific reservoirs.

It is therefore an object of this invention to provide a surfactant composition and oil recovery method utilizing this composition which, in concentrations of less than 2 weight percent, can recover 50 percent or more of residual oil from clay containing sandpack tube tests. It is another object to provide such a surfactant composition and method which can be utilized in the presence of divalent metal cations. It is another object to provide such a surfactant composition and method which is useful in surfactant flooding of residual oil from subterranean formations.

SUMMARY OF THE INVENTION

These and other objects are accomplished by a method to recover oil from a subterranean formation comprising the steps of: a) providing a surfactant mixture comprising at least a first surfactant, the first surfactant comprising at least one ethoxy group, a hydrophilic group, a cation, a hydrophobic radical selected from the group consisting of linear or branched alkyl radicals, and alkyl or alkenyl substituted benzene radicals, and not including any propoxy groups, and a second surfactant, the second surfactant comprising at least one propoxy group, a hydrophilic groups, a cation, a hydrophobic radical selected from the group consisting of linear or branched alkyl radicals, and alkyl or alkenyl substituted benzene radicals, and not including any ethoxy groups; b) injecting the surfactant mixture into the subterranean formation; c) displacing the surfactant mixture through the subterranean formation toward an oil production well whereby the surfactant mixture displaces oil from the formation through which it is displaced; and d) recovering the displaced oil from the oil production well.

Another aspect of the present invention is a surfactant mixture composition comprising: a) a first surfactant, the first surfactant comprising at least one ethoxy group, a hydrophobic radical selected from the group consisting of linear or branched alkyl radicals and alkyl or alkenyl substituted benzene radicals, and not including propoxy groups; and b) a second surfactant, the second surfactant comprising at least one propoxy group, a hydrophobic radical selected from the group consisting of linear or branched alkyl radicals and alkyl or alkenyl substituted benzene radicals, and not including ethoxy groups.

The structure of the individual surfactants of this composition can be adjusted according to the salinity and hardness of water available for the flooding operation, the temperature of the reservoir, and the need to minimize the cost of recovering oil from the formation. The two surfactants may be tailored independently, and combined to provide a surfactant composition having the benefits of a propoxylated-ethoxylated surfactant without the expense or difficulty of ethoxylating a propoxyl composition.

DETAILED DESCRIPTION OF THE INVENTION

A general formula for useful ethoxylated surfactants is:

$$R_1O(C_2H_4O)_nR_2YX$$

wherein $R_1$ is a hydrocarbon radical;

n in an integer selected from the numbers 1 to 15;

$R_2$ is preferably present when the subterranean formation from which oil is to be recovered is at a temperature above about 130° F., and is selected from the group consisting of $-CH_2CH_2-$, $-CH_2CH_2CH_2-$, and

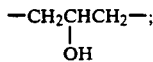

Y is a hydrophilic group; and
X is a monovalent cation.

A general formula for useful propoxylated surfactants is:

$$R_1O(C_3H_6O)_mR_2YX$$

wherein $R_1$ is a hydrocarbon radical;
  m in an integer selected from the numbers 1 to 15;
  $R_2$ is preferably present when the subterranean formation from which oil is to be recovered is at a temperature above about 130° F., and is selected from the group consisting of

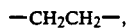

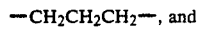

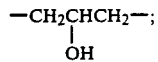

Y is a hydrophilic group; and
X is a monovalent cation.

The hydrocarbon radical $R_1$ may be a linear or branched alkyl radical, an alkenyl radical or an alkyl or alkenyl substituted aromatic radical. The non-aromatic portion of the radical preferably contains from 6 to about 24 carbon atoms.

Preparation of propoxylated and ethoxylated surfactants and the use of these surfactants individually and as propoxylated-ethoxylated surfactants in enhanced oil recovery are disclosed in U.S. Pat. Nos. 4,293,428, 4,446,079, 4,468,335, 4,690,217, and 4,828,032, which are incorporated herein by reference.

When the temperature of the reservoir exceeds about 130° F., the last ethoxy or propoxy group must be separated from the hydrophilic group by at least two carbon atoms. Separation of the ethoxy or propoxy group from the hydrophilic group by an ethyl, propyl or glyceryl group improves the thermal stability of the surfactant.

Surface activities of surfactants are generally very sensitive to changes in temperature, aqueous phase salinity and hardness. Increases in temperature, salinity or hardness generally drive the surfactants into the oil phases resulting in lower surface activities. The propoxylated and ethoxylated segment of these surfactants provide a gradation from oil soluble to water soluble segments. Surfactants that contain both propoxy- and ethoxy- groups provide more of a gradation, but it has been found that a physical mixture provides similar, if not improved results. This gradation results in a surfactant which has a high surface activity over a wider range of conditions due to the retention of a significant amount of the surfactant at the interfacial surface over a wide range of conditions.

U.S. Pat. No. '428 demonstrates that the use of appropriate propoxylated-ethoxylated surfactants at low concentrations can be effective in highly saline environments, at high temperatures, and in the presence of divalent ions. But synthesis of propoxylated-ethoxylated surfactants is relatively expensive. Surfactants that are either propoxylated or ethoxylated are commercially available in many different variations. Therefore, an effective mixture of the two types can be produced without having a tailor-make an acceptable surfactant. This decreases the cost of the surfactants by a factor of about four. Furthermore, it has been found that the mixture of the two surfactants is as effective in oil recovery as the more expensive propoxylated-ethoxylated surfactants.

The hydrophilic group is preferably a carbonate or sulfonate group. Sulfonate groups are most preferred as the hydrophilic group of the propoxy containing surfactant.

Most preferably, m and n each range between about 1 and about 10. The number of propoxy and ethoxy groups (m and n) for different temperature and salt concentrations which minimize interfacial tension may be determined according to methods well known in the art. The surfactant system of the invention can therefore be formulated to be highly effective in brines commonly found in oil field environments.

The monovalent cation is preferably either an alkali metal or an ammonium ion.

The surfactants of the present invention are generally not pure substances, but a mixture of components distributed such that both m or n, and the number of carbon atoms in the hydrophobic radicals are the resulting averages. This is generally the result of raw materials for the synthesis of the surfactants being mixtures of components and the nature of the addition reactions which tend to produce a distribution of products.

Surfactants of the general formulas given above can be prepared in a number of ways. For the sake of brevity and clarity, however, only the preferred method of preparation will be presented herein. Precursors include a $C_6$ to $C_{24}$ linear or branched alcohol, a $C_6$ to $C_{24}$ methyl phenol, or a $C_6$ to $C_{24}$ dimethyl phenol. The alcohol or substituted derivatives is reacted with propylene oxide (PO) to yield an alkyl oxypropylene ether or an alkyl phenyl oxypropylene ether or ethylene oxide (EO) to yield alkyl oxyethylene ether or an alkyl phenyl oxyethylene ether. The average number of propylene oxide or ethylene oxide units (i.e., the value of m or n) can be varied as desired. Preferably, m and n range from about 1 to a value of about 15, and from about 1 to about 10 are preferred.

Methods of alkoxylation are well known. The alkoxylation reaction can be achieved using a strong base or Lewis acid catalyst such as NaOH, KOH, $BF_3$ or $SnCl_2$. Examples of other suitable bases include sodium phenolate and alkali metal alkoxides such as sodium methoxide or propoxide. Other suitable acids include $BF_3$-etherate, p-toluene sulfonic acid, fluorosulfonic acid, aluminum butyrate and perchloric acid.

The hydrophile portion of the ethoxy containing surfactant is most preferably a cationic hydrophobe, such as an ammonium or amine. The hydrophobe portion must be sufficiently hydrophobic to result in the surfactant having surfactant properties. The surfactant may have more than one hydrophilic group connected by hydrophobic groups such as a duo amine. Acceptable cationic surfactants include, for example, tertiary amine salts, quaternary ammonium salts, derivatives of fatty amines and polyamines.

Other acceptable cationic surfactants are available commercially and are often used as water loss additives due to their tendency, when used alone, to be adsorbed on clays within rock formations. Cationic surfactants are therefore not typically utilized in enhanced oil recovery although when used with anionic surfactants, tend to resist adsorption.

The mass ratio of propoxy to ethoxy surfactants is preferably within the range of about 2 to about 40. More preferably, this ratio is within the range of about 4 to about 20. A mass ratio of cationic to anionic surfactant of about 0.15 is most preferred. Generally, the propoxy containing surfactant will be present in the surfactant mixture in a concentration of between about 100 and about 50,000 ppm, and preferably between about 1,000 and about 5,000 ppm.

The best structure for the surfactants will depend upon the salinity of the water flooding medium, and the structure of the other surfactant. The ratio of hydrophilic to hydrophobic portions of either surfactant can be adjusted to result in minimal interfacial surface tensions at the reservoir flooding conditions. A more saline condition usually requires a smaller hydrophobic portion. A higher reservoir temperature also generally dictates that a smaller hydrophobic portion be utilized. Economics dictate that minimal hydrophobic portions be utilized due to surfactants with lower molecular weights generally being less expensive to produce.

The surfactant composition of the present invention is an aqueous composition. The composition may further comprise salts. Salts may be required for flooding of formations containing clay. Fresh water will cause clays to swell and plug the formation. Salt water must therefore be utilized if the formation rock contains more than about 1 percent clay. The aqueous medium must therefore be compatible with the formations. Additionally, fresh water is generally not economical and typically is not available for surfactant flooding.

The aqueous medium preferably has a salinity and hardness approximating that of the formation water. This water will be compatible with the formation. The use of an aqueous medium of a salinity and hardness approximating that of the formation also minimizes variation of the composition of the aqueous composition at the leading edge of the flood. If this salinity varies, the interfacial tensions between the aqueous phase and the oil will vary and alter the preferred surfactant structures.

The surfactant composition of the present composition is effective at total surfactant concentrations as low as 0.01 percent by weight. Concentrations of from 0.01 to about 2.0 are preferred, and concentrations from about 0.05 about 0.25 are more preferred. Of course, the minimal concentration which is found to be effective will be most preferred due to the expense of the surfactants. The minimal effective concentration is defined as that which recovers 50 percent or more of the oil from sand pack tests after 1.5 pore volumes of surfactant slug plus drive brine or polymer thickened drive brine flood.

The effectiveness of the surfactant composition of this invention permits injection of only a slug of the surfactant composition, followed by a flood of water, the water optionally comprising a thickener to help elevate channeling. A slug of less than about 0.5 pore volume of the surfactant composition is preferred. Acceptable thickening agents include polysaccharides such as xanthan and schleroglucan gums which are commercially available from various suppliers. Synthetic high molecular weight polymers such as unhydrolyzed or partially hydrolyzed polyacrylamides are also acceptable providing they are compatible with the injection brine. Xanthan gum is a preferred polymeric thickener due to its availability at competitive prices and effectiveness in high salinity brines at reasonable concentrations. Generally between about 100 and about 1,500 ppm of xanthan gum in either a brine or surfactant mixture is effective to prevent fingering and bypassing of the formation.

Polymeric thickeners are typically utilized in surfactant flooding processes to provide a more uniform flooding front and reduce fingering and bypassing of portions of the formation. These polymeric thickeners may be utilized in the practice of the present invention with the surfactant composition, after the surfactant composition as a displacement slug, or both. The displacement slug may be a thickened brine or a thickened freshwater slug. If freshwater is used, polyacrylamide may be used instead of xanthan gum or other biopolymers.

The improved effectiveness of the surfactant composition can be utilized to reduce the surfactant slug size and to reduce the concentration of surfactants and still result in improved recoveries of residual oils resulting from surfactant flooding operations.

The surfactant flood may also comprise sacrificial surfactants and thickeners in order to improve the effectiveness of the anionic/cationic surfactant composition according to methods known in the art.

EXAMPLES

Sandpack tests were performed utilizing a synthetic seawater flood to demonstrate the effectiveness of the propoxylated/ethoxylated surfactant mixture of the present invention in enhanced oil recovery. Three sets of surfacts were tested at ratios of ethoxy to propoxy containing surfactants that are varied from all ethoxy to all propoxy containing surfactants. In each case, significantly more oil was recovered when mixtures of the two types of surfactants were used.

The first set of surfactants tested was a propoxylated branched alcohol 2-ethyl-hexyl as the base alcohol and an average of about 7 propoxy groups. The hydrophilic group was a sodium sulfonate, and the sulfonate group was separated from the propoxy group by a glycerol group. The ethoxylated surfactant was "AVANEL S-30," commercially available from PPG Industries. The flood was performed at 125° F. A 1 inch diameter, 6 inch long, sand pack of crushed Berea sand stone was used. The surfact compositions included 1200 ppm of Xanthan gum and were made in synthetic sea water. The sandpacks were initially filled with a Gulf Coast crude oil having a viscosity of about 4.2 cp, and subjected to a water flood of a synthetic sea water until oil was no longer produced. The percent of the water flood residual oil recovered after 1.25 pore volumes of surfactant flood was injected was determined, and the surfactant loss was determined as 0.03 meq per 100 gm of sand. Table 1 below includes the results of the first set of surfactants.

TABLE 1

| ppm of Ethoxylated Surfactant | ppm of Propoxylated Surfactant | Percent of oil Recovered | Surfactant loss meq/100 gm sand |
|---|---|---|---|
| 0 | 4000 | 70 | 0.03 |
| 150 | 4000 | 70 | 0.04 |
| 300 | 4000 | 90 | 0.02 |
| 600 | 4000 | 52 | 0.04 |
| 4000 | 0 | 14 | 0.02 |

From Table 1, it can be seen that the surfactant losses to the sandstone were acceptable in all runs. The percent of oil recovered was unexpectedly greater at about 300 ppm of ethoxylated surfactant and 4000 ppm of propoxylated surfactant. Based on this data, a ratio of between about 200 and about 500 ppm of ethoxylated surfactant with about 4000 ppm of propoxylated surfactant will result in unexpected improvement in oil removal efficiency.

The second set of surfactants tested included a linear alcohol having about nine to eleven carbon atoms in the base alcohol with an average of about seven propoxy groups, a sulfonate group and a glycerol group separating the sulfonate group from the propoxy group. The ethoxylated surfactant was a commercially available surfactant, "DOBANOL 25-3S." The surfactant is sulfate on an ethoxylated linear alcohol having from 12 to 15 carbon atoms with an average of 3 EO groups per molecule, and is available from Shell International Petroleum Company, London, U.K.

A one inch diameter by six inch long core was filled with a Gulf Coast crude oil and then displaced with synthetic sea water until oil was no longer produced. The pack consisted of "CLEMTEX #5" sand with 0.5 percent by weight Glen Rose shale. The surfactant flood was performed at about six feet per day rate at 200° F. The surfactant composition included about 1200 ppm of a Xanthan gum thickener. The surfactant slug was followed by a synthetic sea water flood containing 1290 ppm Xanthan gum. Table 2 includes the concentration of each surfactant, the size of the surfactant slug in pore volumes, the percent of oil recovery after 1.25 pore volumes total of surfactant and polymer drive. The dynamic cloud point of the solution not containing ethoxylated surfactant was about 177° F., and the dynamic cloud point of the other solutions exceeded 200° F.

TABLE 2

| ppm Ethoxylated Surfactant | ppm Propoxylated Surfactant | Slug Size Pore Volumes | % Oil Recovery |
|---|---|---|---|
| 0 | 4000 | 1.4 | 40 |
| 500 | 4000 | 1.0 | 94 |
| 1000 | 4000 | 0.5 | 86 |
| 2000* | 4000 | 0.68 | 53 |
| 4000 | 0 | 0.75 | 8 |

*experiment was terminated after 1.1 pore volumes, but no oil was recovered after 0.9 pore volumes The third set of surfactants included the propoxylated surfactant of the second set, with "AVANEL S-30" as the ethoxylated surfactant. "AVANEL S-30" is an ethyl sulfonate of an ethoxylated linear alcohol having from 12 to 15 carbon atoms with an average of 3 EO groups per molecule. Conditions of the test were otherwise the same as those for the second set. Table 3 summarizes the results.

TABLE 3

| ppm Ethoxylated Surfactant | ppm Propoxylated Surfactant | Slug Size Pore Volumes | % Oil Recovery |
|---|---|---|---|
| 0 | 4000 | 1.4 | 40 |
| 250 | 4000 | 0.75 | 70 |
| 500 | 4000 | 0.75 | 76 |
| 1000 | 4000 | 0.79 | 55 |
| 2000 | 4000 | 0.75 | 41 |
| 4000 | 0 | 0.75 | 8 |

These three sets of surfactants all demonstrate an improvement in oil recovery with inclusion of ethoxylated surfactant. About 200 to about 500 ppm of ethoxylated surfactant with about 4000 ppm of propoxylated surfactant is optimal for each set of surfactants tested.

The example above demonstrates a significantly improved surfactant composition, but is not an optimized system. People of ordinary skill in the art are able to determine surfactant structures which can be utilized at the desired reservoir temperatures and brine compositions and retain the unexpected benefits of the above examples. Increasing the temperature at which the interfacial tension of a surfactant composition and crude oil is minimal is accomplished by adjusting the length of the hydrophobic portions of the surfactants. A change in the number of propoxy and/or ethoxy units of the surfactant may then be necessary in order to retain excellent interfacial surface tensions at the salinity of reservoir brines. Otherwise tailoring these surfactants to function well at reservoir conditions at a minimal expense is within the skill of persons practicing in the art of enhanced oil recovery by surfactant flooding.

The preceding examples are illustrative only, and the following claims define the scope of the present invention.

I claim:

1. A method to recover oil from a subterranean formation comprising the steps of:
   a) providing a surfactant mixture comprising at least a first surfactant, the first surfactant comprising at least one ethoxy group, a hydrophilic group, a cation, a hydrophobic radical selected from the group consisting of linear or branched alkyl radicals, and alkyl or alkenyl substituted benzene radicals, and not including any propoxy groups, and a second surfactant, the second surfactant comprising at least one propoxy group, a hydrophilic groups, a cation, a hydrophobic radical selected from the group consisting of linear or branched alkyl radicals, and alkyl or alkenyl substituted benzene radicals, and not including any ethoxy groups;
   b) injecting the surfactant mixture into the subterranean formation;
   c) displacing the surfactant mixture through the subterranean formation toward an oil production well whereby the surfactant mixture displaces oil from the formation through which it is displaced; and
   d) recovering the displaced oil from the oil production well.

2. The method of claim 1 wherein the mass ratio of the first surfactant to the second surfactant is between about 0.01 and about 2.0.

3. The method of claim 2 wherein the mass ratio of the first surfactant to the second surfactant is between about 0.05 and about 0.25.

4. The method of claim 1 wherein the surfactant mixture comprises between about 100 and about 50,000 ppm by weight of the second surfactant.

5. The method of claim 4 wherein the surfactant mixture comprises between about 1,000 and about 5,000 ppm by weight of the second surfactant.

6. The method of claim 1 wherein the surfactant mixture further comprises an amount of polymeric thickener effective to provide mobility control for the displacement of the oil.

7. The method of claim 6 wherein the polymeric thickener is Xanthan gum.

8. The method of claim 6 wherein the polymeric thickener is present in the surfactant mixture in a concentration of between about 100 and about 1,500 ppm by weight.

9. The method of claim 6 wherein the injection of the surfactant mixture is followed by injection of a thickened brine to displace the surfactant mixture.

10. The method of claim 6 wherein the first surfactant comprises a linear or branched alkyl radical containing between about 6 and about 24 carbon atoms and between about 1 and about 10 ethoxy groups.

11. The method of claim 1 wherein the second surfactant comprises a linear or branched alkyl radical containing between about 6 and about 24 carbon atoms and between about 1 and about 10 propoxy groups.

* * * * *